United States Patent
Bennett

(10) Patent No.: US 9,908,456 B2
(45) Date of Patent: Mar. 6, 2018

(54) AMBULANCE COT PLATFORM SYSTEM

(71) Applicant: Devon L. Bennett, Purdy, MO (US)

(72) Inventor: Devon L. Bennett, Purdy, MO (US)

(*) Notice: Subject to any disclaimer, the term of this patent is extended or adjusted under 35 U.S.C. 154(b) by 98 days.

(21) Appl. No.: 14/924,944

(22) Filed: Oct. 28, 2015

(65) Prior Publication Data
US 2017/0119601 A1    May 4, 2017

(51) Int. Cl.
*F16M 13/00* (2006.01)
*B60P 7/16* (2006.01)
*A61G 3/02* (2006.01)

(52) U.S. Cl.
CPC .......... *B60P 7/16* (2013.01); *A61G 3/0218* (2013.01); *A61G 2203/34* (2013.01); *A61G 2203/44* (2013.01); *A61G 2203/723* (2013.01)

(58) Field of Classification Search
CPC ...... A61G 1/06; A61G 3/061; A61G 2203/44; B60N 2/52; B60N 2/522; B60N 2/525; F16F 2228/10; F16F 9/00
USPC ............... 60/409; 108/20, 144.11, 145–147; 248/550, 562, 566, 654, 561; 267/256; 5/611, 615
See application file for complete search history.

(56) References Cited

U.S. PATENT DOCUMENTS

| 42,152 A | 4/1864 | Arnold |
| 48,404 A | 6/1865 | Howard |
| 398,517 A | 2/1889 | Lawrence |
| 546,855 A | 9/1895 | Hutchinson |
| 1,517,069 A | 11/1924 | Huddart |
| 2,324,685 A | 7/1943 | Ekman et al. |
| 2,537,664 A | 1/1951 | Golding |
| 3,752,526 A | 8/1973 | Ven Der Burgt et al. |
| 6,890,137 B2 | 5/2005 | Hillberry et al. |
| 6,942,226 B2 | 9/2005 | Walkingshaw |
| 7,124,454 B2 | 10/2006 | Walkingshaw |
| 7,409,734 B2 | 8/2008 | Benedict et al. |
| 7,621,705 B2 | 11/2009 | Hillberry et al. |
| 8,156,586 B2 | 4/2012 | Reed et al. |
| 2007/0278723 A1* | 12/2007 | Shoemaker ............ B60N 2/501 267/131 |
| 2008/0156602 A1* | 7/2008 | Hiemenz .............. B60N 2/4242 188/267.1 |
| 2013/0133317 A1* | 5/2013 | Zumbrum .............. A61G 3/006 60/325 |
| 2013/0328253 A1* | 12/2013 | Kraner ................. G05B 19/404 267/140.14 |

* cited by examiner

Primary Examiner — Christopher Garft
(74) Attorney, Agent, or Firm — Martin & Associates, LLC; Derek P. Martin

(57) ABSTRACT

An ambulance cot platform system allows variably raising a cot platform to many different positions to accommodate patients with varying weights. After a cot with a patient is placed on the cot platform, the weight of the patient is determined, and a desired position of multiple defined positions of the cot platform is determined from the patient's weight. The multiple defined positions may be a function of air pressure in air bladders, or the physical location of the platform itself. The air bladders are then inflated or deflated until the desired position of the cot platform is achieved. The result is a cot platform that has different positions to accommodate patients of different weights, thereby providing a ride with comfort that is optimized according to the weight of the patient being transported.

19 Claims, 8 Drawing Sheets

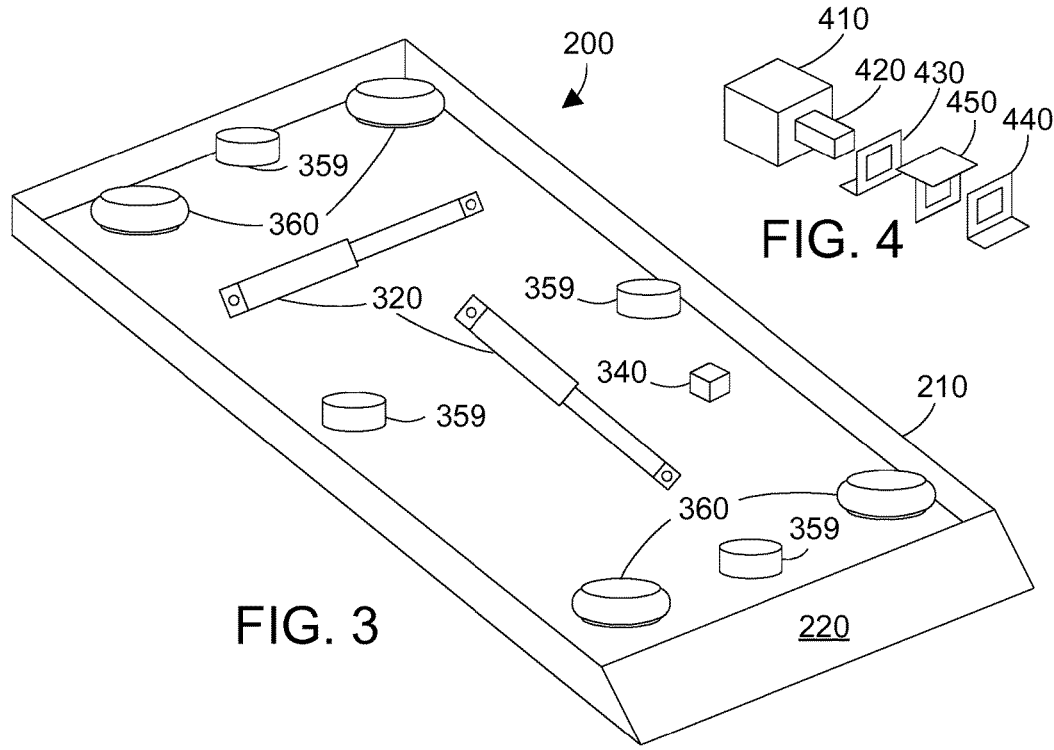
FIG. 3
FIG. 4
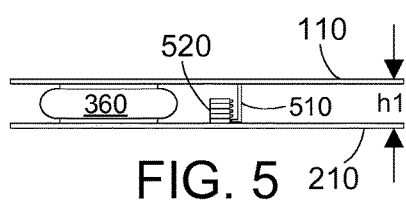
FIG. 5
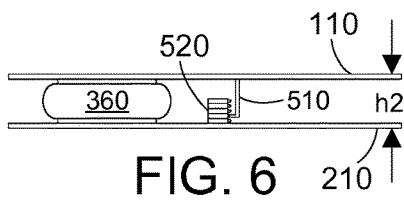
FIG. 6
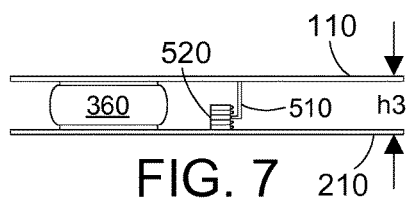
FIG. 7
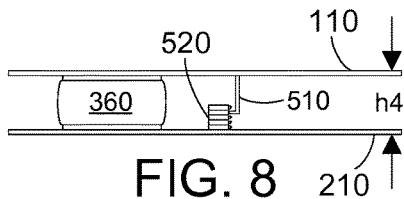
FIG. 8
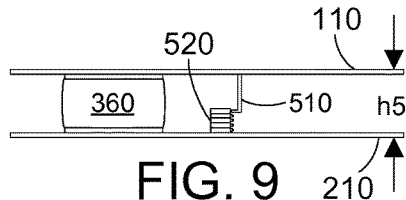
FIG. 9

| Weight | Desired Pressure |
|---|---|
| 0 to 10 lbs (0 to 4.5 kg) | 0 psi (0 kPa) |
| 10 to 50 lbs (4.5 to 22.7 kg) | 3.5 psi (24.1 kPa) |
| 50-165 lbs 22.7 to 75 kg) | 8.0 psi (55.2 kPa) |
| 165-250 lbs (75 to 114 kg) | 11.5 psi (79.3 kPa) |
| Over 250 lbs (114 kg) | 13 psi (89.6 kPa) |

AMBULANCE COT PLATFORM SYSTEM

BACKGROUND

1. Technical Field

This disclosure generally relates to emergency vehicles, and more particularly relates to ambulances.

2. Background Art

Ambulances have been used from the days of horse-drawn carriages. When an injured person is being transported in an ambulance, any bump or jolt can cause pain. Thus, the need to cushion the ride of a patient in an ambulance is a long-recognized need. For example, U.S. Pat. No. 42,152 issued on Apr. 5, 1864 to Arnold discloses an ambulance that includes a couch that yields or gives vertically under the jarring movement of the ambulance. Many other devices and systems have been developed over the years to give a patient a more comfortable ride in an ambulance.

U.S. Pat. Nos. 6,890,137 and 7,621,705 to Hillberry et al. disclose a system for supporting an ambulance cot that includes vibration reduction devices upon which the wheels of an ambulance cot may be placed. The vibration reduction devices are supported by springs, which cushion the ambulance cot to provide a smoother ride for the patient on the cot. The use of springs makes the Hillberry system unsuitable for different patients with a wide variance of weight. For example, if the springs are selected to provide a comfortable ride for a heavy patient, the same springs will provide a very stiff ride to a much lighter patient. If the springs are selected to provide a comfortable ride for a light patient, the springs could bottom out for a heavy patient. Given the wide range of weights of patients transported by ambulances, the spring-based system in the Hillberry patents does not provide the needed range of function as weights vary.

U.S. Patent Application Publication No. 2013/0133317 to Zumbrum discloses an ambulance shock absorbing system includes gas actuators mounted to an ambulance floor, and a stage mounted atop the gas actuators. The Zumbrum system includes limit switches that define two positions of the stage based on the state of the gas actuators. To raise the stage in Zumbrum from its lower position, a valve is opened and gas inflates the gas actuators until the gas actuators raise the stage to a position until the upper limit switch is activated, which causes the valve to close, thereby keeping the stage at its upper position defined by the upper limit switch. To lower the stage in Zumbrum from its upper position, the valve is opened, allowing the gas in the gas actuators to exhaust out, thereby lowering the stage until it contacts the lower limit switch, at which point the valve is closed, thereby keeping the stage at its lower position defined by the lower limit switch.

The Zumbrum system only has two positions for the stage, an upper position and a lower position. This means when a patient is being transported, the stage is moved to its upper position. The one upper position in Zumbrum does not accommodate patients whose weights vary widely. In addition, the Zumbrum system does not include many desirable features.

BRIEF SUMMARY

An ambulance cot platform system allows variably raising a cot platform to many different positions to accommodate patients with varying weights. After a cot with a patient is placed on the cot platform, the weight of the patient is determined, and a desired position of multiple defined positions of the cot platform is determined from the patient's weight. The multiple defined positions may be a function of air pressure in air bladders, or the physical location of the platform itself. The air bladders are then inflated or deflated until the desired position of the cot platform is achieved. The result is a cot platform that has different positions to accommodate patients of different weights, thereby providing a ride with comfort that is optimized according to the weight of the patient being transported.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 3 is a perspective view of the ambulance cot platform system shown in FIG. 2 with the platform removed to allow seeing various components within the ambulance cot platform system;

FIG. 4 is a perspective view of one specific implementation for the platform lock;

FIG. 5 is a partial cross-sectional diagram showing the cot platform in its lowest position, with the position of the cot platform being determined by multiple limit switches;

FIG. 6 is a partial cross-sectional diagram showing the cot platform in a first upper position;

FIG. 7 is a partial cross-sectional diagram showing the cot platform in a second upper position;

FIG. 8 is a partial cross-sectional diagram showing the cot platform in a third upper position;

FIG. 9 is a partial cross-sectional diagram showing the cot platform in a fourth upper position;

DETAILED DESCRIPTION

An ambulance cot platform system allows variably raising a cot platform to many different positions to accommodate patients with varying weights. After a cot with a patient is placed on the cot platform, the weight of the patient is determined, and a desired position of multiple defined positions of the cot platform is determined from the patient's weight. The multiple defined positions may be a function of air pressure in air bladders, or the physical location of the platform itself. The air bladders are then inflated or deflated until the desired position of the cot platform is achieved. The result is a cot platform that has different positions to accommodate patients of different weights, thereby providing a ride with comfort that is optimized according to the weight of the patient being transported.

Figure 1:
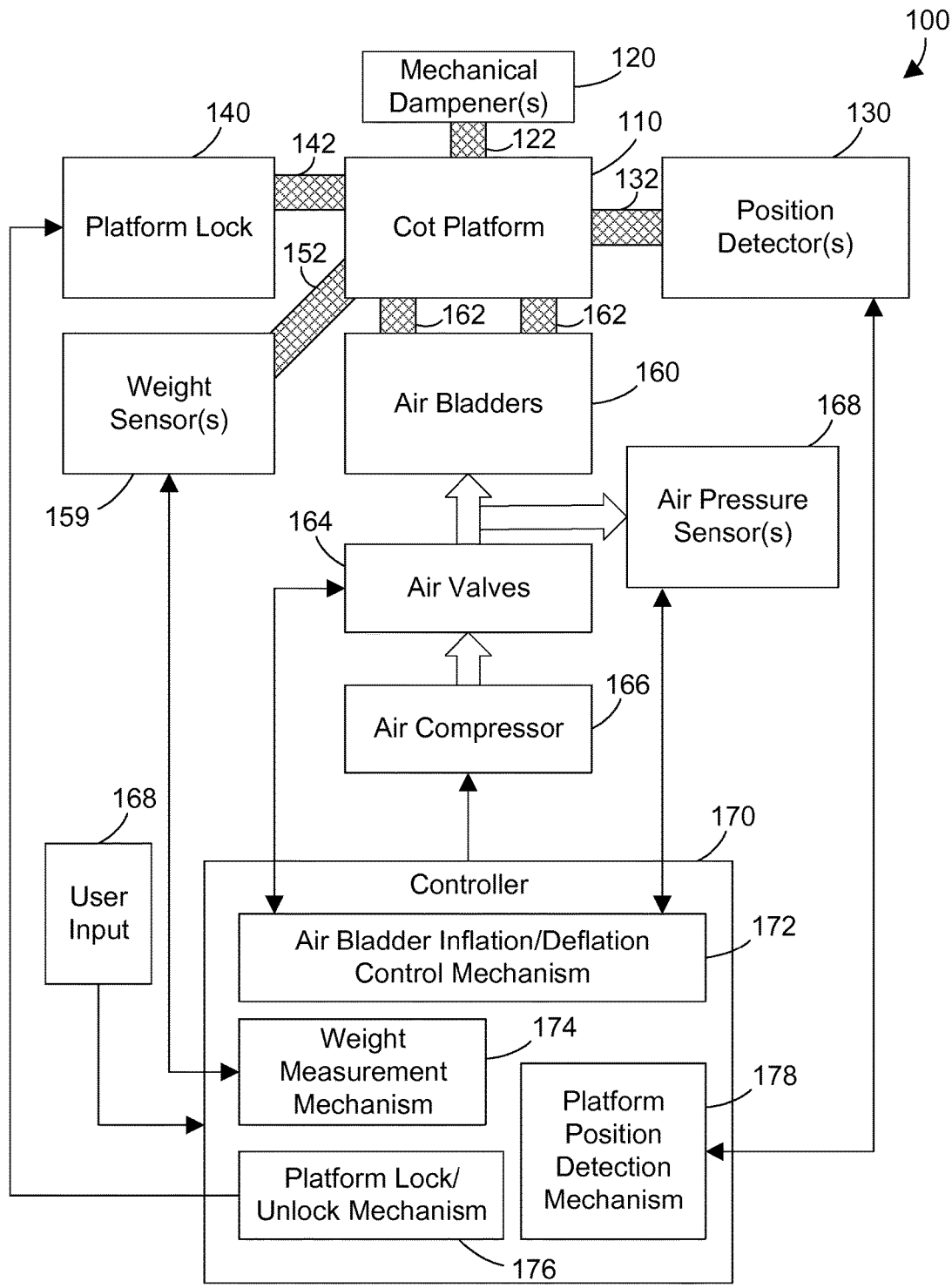
FIG. 1 is block diagram of an ambulance cot platform system.

Referring to FIG. 1, an ambulance cot platform system 100 is shown. Cot platform system 100 preferably includes a cot platform 110 coupled to a plurality of air bladders 160 that can be inflated or deflated with air to vary vertical position of the cot platform 110 between a lower position and a plurality of upper positions. The air bladders 160 receive air from an air source such as air compressor 166 through one or more air valves 164. The air compressor 166 and air valves 164 are activated and deactivated by the controller 170. Air valves 164 are preferably a multifunction air valve that allows inflating the air bladders and also deflating the air bladders by exhausting air in the air bladders to ambient. The cot platform system 100 can optionally include one or more air pressure sensors 168 that sense the air pressure in the air bladders 160 and communicate this air pressure to the controller 170. The cot platform system 100 preferably includes one or more weight sensor(s) 159 that are used to sense the weight on the cot platform 110 and communicate the weight to the controller 170. One or more load cells could be used as weight sensor(s) 159. Of course, any suitable weight sensor could be used. A platform lock 140 can be included in the cot platform system 100 to lock the cot platform 110 into a lower, locked position when a patient is not being transported on the cot platform 110. The platform lock 140 may be activated to lock the cot platform or deactivated to unlock the cot platform as needed by controller 170. The cot platform system 100 may optionally include one or more mechanical dampeners 120 that are mechanically coupled to the cot platform 110 to minimize lateral movement of the cot platform 110. Mechanical dampener(s) could include, for example, piston-type shock absorbers, hydraulic cylinders, air cylinders, springs, dashpots, etc. The cot platform system 100 may also include one or more position detectors 130 that detect position of the cot platform. The position detectors 130 may indicate to the controller 170 when the cot platform 110 is at a desired position. There are mechanical couplings between the cot platform 110 and some of the other components in FIG. 1, as shown by the hashed regions. Thus, mechanical dampener(s) 120 include one or more mechanical couplings 122 to the cot platform 110. The position detector(s) 130 include one or more mechanical couplings 132 to the cot platform 110. The air bladders 160 include one or more mechanical couplings 162 to the cot platform 110. For example, air bladders 160 may include threaded screw holes, with corresponding holes in the cot platform that allow a screw to be placed through the hole in the cot platform into a threaded screw hole on an air bladder, thereby securing the cot platform 110 to the air bladders 160. The cot platform 110 also includes a mechanical coupling 152 to the one or more weight sensors 159 so the weight sensors can sense the weight on the cot platform 110. The platform lock 140 may include a mechanical coupling 142 between the platform lock 140 and the cot platform 110 so the cot platform 110 is held in a locked position when the platform lock 140 is engaged.

The controller 170 allows inflating or deflating the air bladders as needed until the cot platform 110 is at a desired position. Note the desired position can be determined by air pressure in the air bladders 160, as determined by the one or more air pressure sensors 168, or alternatively can be determined using the position detector(s) 130. In one specific implementation, both the air pressure sensor(s) 168 and the position detector(s) 130 may be used by the controller 170 to determine position of the cot platform 110. For example, the controller 170 initially could cause the air bladders 160 to be inflated to a desired air pressure as determined by the air pressure sensor(s) 168, and could then verify using the position detector(s) 130 that the cot platform 110 is at the desired position.

The controller 170 preferably includes an air bladder inflation/deflation mechanism 172, a weight measurement mechanism 174, a platform lock/unlock mechanism 176, and a platform position detection mechanism 178. The air bladder inflation/deflation mechanism 172 can activate the air compressor 166 and air valves 164, and read the pressure in the air bladders 160 from the air pressure sensor(s) 168. The weight measurement mechanism 174 determines from the weight sensor(s) 159 the weight on the cot platform 110. Note the weight measurement mechanism 174 can include the ability to weigh different things. For example, the weight measurement mechanism 174 can determine the weight of the cot platform without a cot, can determine the weight of the cot platform with an empty cot, and can perform calculations to determine weight of a patient on the cot by subtracting the weight of the cot platform and the weight of the empty cot from the total weight.

The platform lock/unlock mechanism 176 provides an interface for the controller 170 to activate (lock) and deactivate (unlock) the platform lock 140. For example, if the platform lock 140 is a linear solenoid, the platform lock/unlock mechanism 176 provides the interface to appropriately activate and deactivate the linear solenoid. The platform position detection mechanism 178 receives information from one or more position detectors 130 to determine position of the cot platform 110. The position detectors 130 and corresponding platform position detection mechanism 178 could be any suitable technology, whether currently known or developed in the future. For example, the position detectors 130 could include one or more limit switches, with the platform position detection mechanism 178 determining when the limit switches open and close to determine position of the cot platform 110. In the alternative, the position detector(s) 130 could include one or more optical sensors, while the platform position detection mechanism 178 determines from the optical sensors the position of the cot platform 110. The position detector(s) 130 could be a variable resistor that changes resistance according to the position of the cot platform 110. The position detector(s) 130 could be any suitable type of proximity detector. Of course, many other types of position detectors could be used, all of which are within the scope of the disclosure and claims herein.

The controller 170 includes the ability to receive user input 168 from any suitable input device. For example, a simple push-button "On" switch could indicate to the controller 170 that a cot with a patient has been placed on the cot platform 110, which tells the controller 170 it is time to determine the weight of the patient and to set the position of the cot platform 110 according to the patient's weight to provide a comfortable ride to the patient. Of course, other types of user interfaces could be used to provide user input 168, including a keypad, a touch-screen, a keyboard, a voice recognition interface, etc.

The controller 170 could be custom-designed to provide the functions described herein. In the alternative, the controller 170 could off-the-shelf hardware in the form of a programmable logic controller (PLC) with modules and programming to perform the functions described herein. One suitable PLC is the Click PLC sold by AutomationDirect.com as part number C0-02DR-D, with a corresponding 4-channel analog input module C0-04AD-1. A suitable 24 volt DC power supply could also be used, such as PSB24-060S-P sold by AutomationDirect.com. One skilled in the art will recognize how to assemble a PLC with the appropriate modules to support the functions herein, and how to program the PLC based on the flow diagrams herein.

The cot platform system 100 solves a problem not addressed in the art. The prior art referenced in the Background Art section above recognizes the benefit of providing springs or gas actuators to soften the ride of a patient on an ambulance cot. But mechanical springs cannot provide a ride that varies according to a patient's weight, and gas actuators that are either inflated or deflated cannot provide a ride that varies according to a patient's weight. The invention disclosed and claimed herein is based on the need to vary the ride of a patient on an ambulance cot according to the weight of the patient. Thus, both light and heavy patients will have a ride that is customized to provide them optimal comfort by varying the position of the cot platform.

While air bladders 160 are shown in FIGS. 1, 3 and 5-9, one skilled in the art will appreciate that air bladders are more broadly characterized as variable supports that are each adjustable to a plurality of vertical positions. Other types of variable supports are within the scope of the disclosure and claims herein, including hydraulic supports, mechanical supports, and any other variable supports that are adjustable to a plurality of vertical positions, whether the variable supports are currently known or developed in the future.

Figure 2:
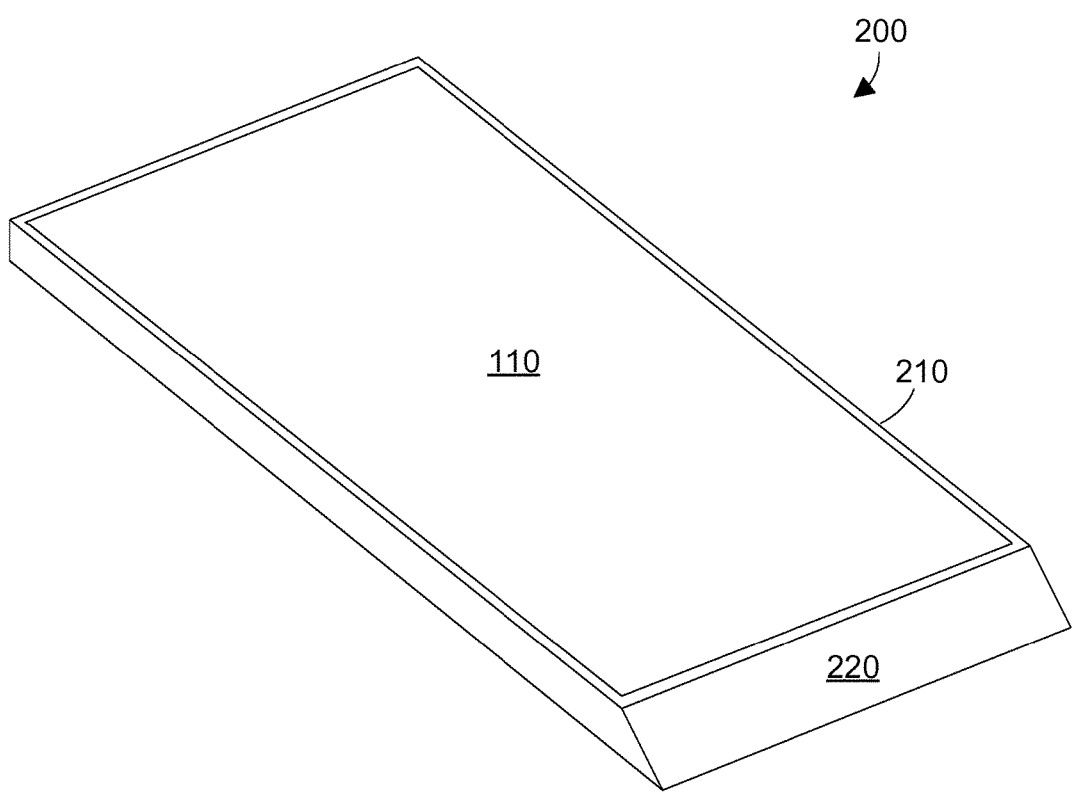
FIG. 2 is a perspective view of one specific implementation for the ambulance cot platform system shown in FIG. 1.

FIG. 2 shows one suitable example of an ambulance cot platform system 200 that is one specific embodiment of the ambulance cot platform system 100 shown in FIG. 1. Ambulance cot platform system 200 is shown to include a platform 110 and a lower base portion 210. In the most preferred implementation, the base portion 210 includes a beveled ramp 220 so the cot platform system 200 can be retro-fitted into existing ambulances and so the ramp 220 allows a cot with a patient to be rolled onto the platform 110.

Details of the ambulance cot platform system 200 shown in FIG. 2 are shown in FIG. 3 by showing the cot platform system 200 with the platform 110 removed. The specific cot platform system 200 shown in FIG. 3 includes four air bladders 360 at each corner of the platform, four load cells 359 that are used to weigh the cot platform and a cot and patient placed on the cot platform, a platform lock 340 that locks the platform in its lower position, and two mechanical dampeners 320 that are mounted at right angles to each other with one end attached to the bottom of base portion 210 and the other end attached to the platform 110.

The specific implementation shown in FIG. 3 includes four air bladders 360 for the purpose of illustration, but one skilled in the art will appreciate any suitable number of air bladders or other variable supports that are each adjustable to a plurality of vertical positions could be used. For example, a single air bladder could be used if a mechanical suspension system were provided that would alter the position of the platform based on the vertical position of the single air bladder. Similarly, two air bladders could be used if a mechanical suspension system were provided that would alter the position of the platform based on the vertical position of the two air bladders. Four air bladders as shown in FIG. 3 are preferred because by placing an air bladder at each corner of the platform, there is no need for any mechanical suspension to move the platform up and down. Of course, additional air bladders could also be used. In addition, any suitable number of air valves 164 in FIG. 1 and air pressure sensors 168 could be used. In one implementation, a single air valve 164 could provide air pressure to the four air bladders 360 shown in FIG. 3 simultaneously, which means only a single air pressure sensor 168 is needed to detect the air pressure that is common to all four air bladders. In an alternative implementation, the two air bladders 360 closest to the ramp 220 in FIG. 3 could be controlled by a first air valve, and the two air bladders 360 farthest from the ramp 220 could be controlled by a second air valve, which would then require two corresponding air pressure sensors 168 to monitor air pressure in these two sets of air bladders. In yet another alternative implementation, each air bladder 360 in FIG. 3 could have its own air valve 164 and corresponding air pressure sensor 168. The disclosure and claims herein extend to any suitable configuration that includes any suitable number of air bladders, air valves, and air pressure sensors. One skilled in the art will readily understand how to connect the compressor to the air valves and to the air bladders according to the specific desired configuration. One suitable air control valve that could be used is multifunction air control valve manufactured by Nitra Pneumatics and sold by AutomationDirect.com as part number AVS-543C4-24D. One suitable air pressure sensor 168 is manufacture by Pro Sense and sold by AutomationDirect.com as part number SPT25-20-0030D. Any suitable compressor could also be used. Ambulances typically have compressors already on-board, so the existing compressor on the ambulance could be used.

Various types and configurations of air bladders are available from a variety of different vendors. The term "air bladder" is used herein to mean any type of variable support that is adjustable to a plurality of vertical positions by inflating and deflating the variable support with air. Some air bladders include a single air chamber while others have multiple air chambers. One suitable air bladder that could be used in the configuration shown in FIG. 3 is made by Enidine as part number Y1-1D5-510. Of course, any suitable air bladder or other variable support could be used within the scope of the disclosure and claims herein.

The configuration in FIG. 3 also shows four load cells 259 spaced at different locations on the platform. This is shown by way of example, and any suitable number of load cells could be used in any suitable location or locations. For example, because the weight of the patient does not have to be measured precisely, a single load cell towards the center of the platform could be used. The four load cells 359 shown in FIG. 3 allow taking a relatively precise measurement of the patient's weight. Load cells are well-known in the art, and can include analog load cells that require an excitation voltage and that produce a corresponding low-voltage signal that is proportional to the weight on the load cell. If analog load cells are used as weight sensors 159 in FIG. 1, the weight measurement mechanism 174 in FIG. 1 will require circuitry to provide the excitation voltage to the load cells and to read the low-voltage signal from the load cells, and will require either hardware or software or a combination of the two to convert the low-voltage signal to a weight. Digital load cells could also be used. Digital load cells include circuitry that provides the excitation voltage and detects the low-voltage signal, and converts the low-voltage signal to corresponding digital data representative of the weight. Digital load cells typically cost more than analog load cells due to the additional circuitry. When digital load cells are used as weight sensors 159, the weight measurement mechanism 174 needs only to receive the digital data from the load cells to determine the weight on each load cell. Thus, the additional cost of digital load cells can be partially offset by a simplified design in the weight measurement mechanism 174.

A platform such as that shown in FIG. 2 is well-suited to the use of what are known in the art at "pancake-type" load cells. One suitable pancake-type load cell is Futek Model LCF300, item # FSH00252, which has a 100 lb. (45.4 kg) capacity. Thus, with four of these load cells as shown in FIG. 3, the ambulance cot platform system 200 could weigh a platform plus cot plus patient up to 400 lbs (182 kg).

One suitable example of the platform lock 340 is shown in FIG. 4 to include a linear solenoid 410 with a plunger member 420 that extends outwardly from the solenoid 410 when activated, and that retracts into the solenoid 410 when deactivated. One suitable linear solenoid that could be used is a locking solenoid from Dernfu Electronics, part number DRF-0-1380-01. First and second slot members 430 and 440 include slots that are slightly larger than the cross-section of the plunger member 420 so the plunger member 420 extends through both slot members 430 and 440 to engage those slot members when extended and retracts from both slot members 430 and 440 to disengage those slot members when retracted. The slot members 430 and 440 are preferably fixedly attached to the bottom of the base portion 210, such as by welding or using one or more suitable fasteners. Another slot member 450 is fixedly attached to the bottom surface of the platform 110 and is positioned between the two slot members 430 and 440. When the platform is at its lower position, the slot in slot member 450 aligns with the slots in slot members 430 and 440, so that when the solenoid 410 is activated, the plunger 420 extends through the slots on all three slot members 430, 450 and 440, thereby locking the platform in its lower position. When a cot is placed on the platform, the controller deactivates the solenoid 410, causing the plunger 420 to retract from the slots 430, 450 and 440, thereby freeing the platform 110 to move upwards to one of its upper positions to provide a comfortable ride to a patient.

The mechanical dampeners 320 shown in FIG. 3 are preferably piston-type shock absorbers that can use springs, air, hydraulics, etc. to dampen, and thereby minimize, lateral movement of the platform. By placing two mechanical dampeners 320 along both the width and the length of the platform, the mechanical dampeners 320 can minimize lateral movement of the platform along two axes. The mechanical dampeners 320, by minimizing lateral movement of the platform, help to prevent damage to the air bladders 360 and the load cells 359, and help to provide a more comfortable ride to a patient.

FIGS. 5-9 illustrate a portion of a cot platform 110 in various positions with respect to the bottom of base portion 210 by adjusting air pressure in an air bladder 360. Each air bladder 360 preferably includes a top plate and bottom plate that are rigid and can be attached to the platform 110 and the bottom of base portion 210, as shown in FIGS. 5-9, and further includes an inflatable middle that allows the air bladder to be adjustable to a plurality of vertical positions by pressurizing the inflatable middle with air. A switch actuator arm 510 is fixedly attached to the bottom of platform 110 and is positioned in proximity to a plurality of limit switches 520 so as the platform 110 moves up and down, different proximity switches 520 are actuated. Thus, FIG. 5 shows the air bladder 360 in a substantially deflated state so the platform 110 is at its lowest position h1. The actuator arm 510 is shown actuating the lowest limit switch 520, which indicates the platform is at its lower position. FIG. 6 shows the air bladder 360 in a more inflated state than FIG. 5 so the platform 110 is at a first upper position h2. The actuator arm 510 is shown actuating the second-to-the-bottom limit switch 520, which indicates the platform is at its first upper position. FIG. 7 shows the air bladder 360 in a more inflated state than FIG. 6 so the platform is at a second upper position h3. The actuator arm 510 is shown actuating the middle limit switch 520, which indicates the platform is at its second upper position. FIG. 8 shows the air bladder 360 in a more inflated state than FIG. 7 so the platform is at a third upper position h4. The actuator arm 510 is shown actuating the second-to-the-top limit switch 520, which indicates the platform is at its third upper position. FIG. 9 shows the air bladder 360 in a more inflated state than FIG. 8 so the platform is at a fourth upper position h5. The actuator arm 510 is shown actuating the top limit switch 520, which indicates the platform is at its fourth upper position. FIGS. 5-9 are shown to indicate how an air bladder can be inflated or deflated to achieve different positions for the platform 110. One skilled in the art will recognize many changes could be made within the scope of the disclosure herein. For example, the limit switches 520 are shown all stacked together and actuated by a single actuator arm. Instead, the limit switches 520 could be separated from each other and could each be actuated by their own respective actuator arm. One suitable limit switch that could be used is Honeywell part number SL1-A. Furthermore, limit switches 520 are shown as one possible way to detect position of the platform 110, but the disclosure and claims herein expressly extend to any suitable way to detect position of the platform 110, whether currently known or developed in the future. One specific way to detect position of the platform 110 is by detecting the air pressure in the air bladders 360, as described in more detail below.

Figure 10:
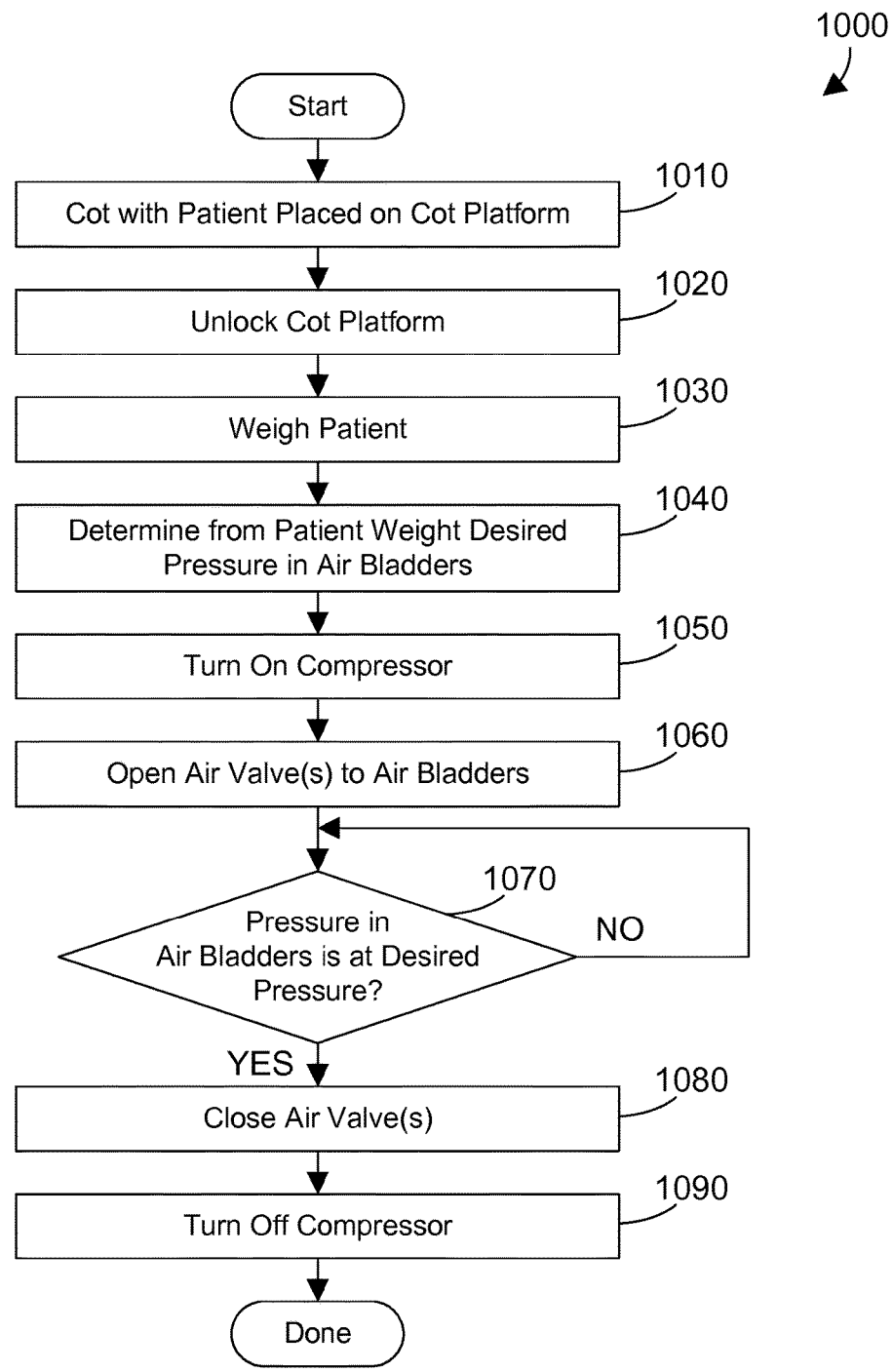
FIG. 10 is a flow diagram of a method for setting the position of the cot platform according to desired air pressure in the air bladders that is determined from weight of the patient.

Referring to FIG. 10, a method 1000 shows steps for providing a comfortable ride in an ambulance based on a patient's weight. A cot with a patient is placed on the cot platform (step 1010). The cot platform is unlocked (step 1020). The patient is weighed (step 1030). Note that weighing the patient in step 1030 may include weighing the patient plus the weight of the cot, or may include weighing the total weight of the patient and cot, then subtracting the weight of the cot to calculate the weight of the patient. The controller then determines from the weight of the patient the desired pressure in the air bladders (step 1040). The controller turns on the compressor (step 1050) and opens the air valve(s) to the air bladders (step 1060). As long as the air pressure is not at the desired pressure (step 1070=NO), method 1000 loops back to step 1070 until the pressure in the air bladders is at the desired pressure (step 1070=YES). At this point the controller closes the air valve(s) (step 1080) and turns off the compressor (step 1090). Method 1000 is then done. The result of method 1000 is the platform has been adjusted to a desired platform position based on the air pressure in the air bladders to assure the patient has a comfortable ride based on the patient's weight. Note that a comfortable ride can be achieved using method 1000 for a patient who is very light, such as a child, or a patient who is very heavy, because the pressure in the air bladders will vary according to the weight of the person on the cot.

Figures 11, 12:
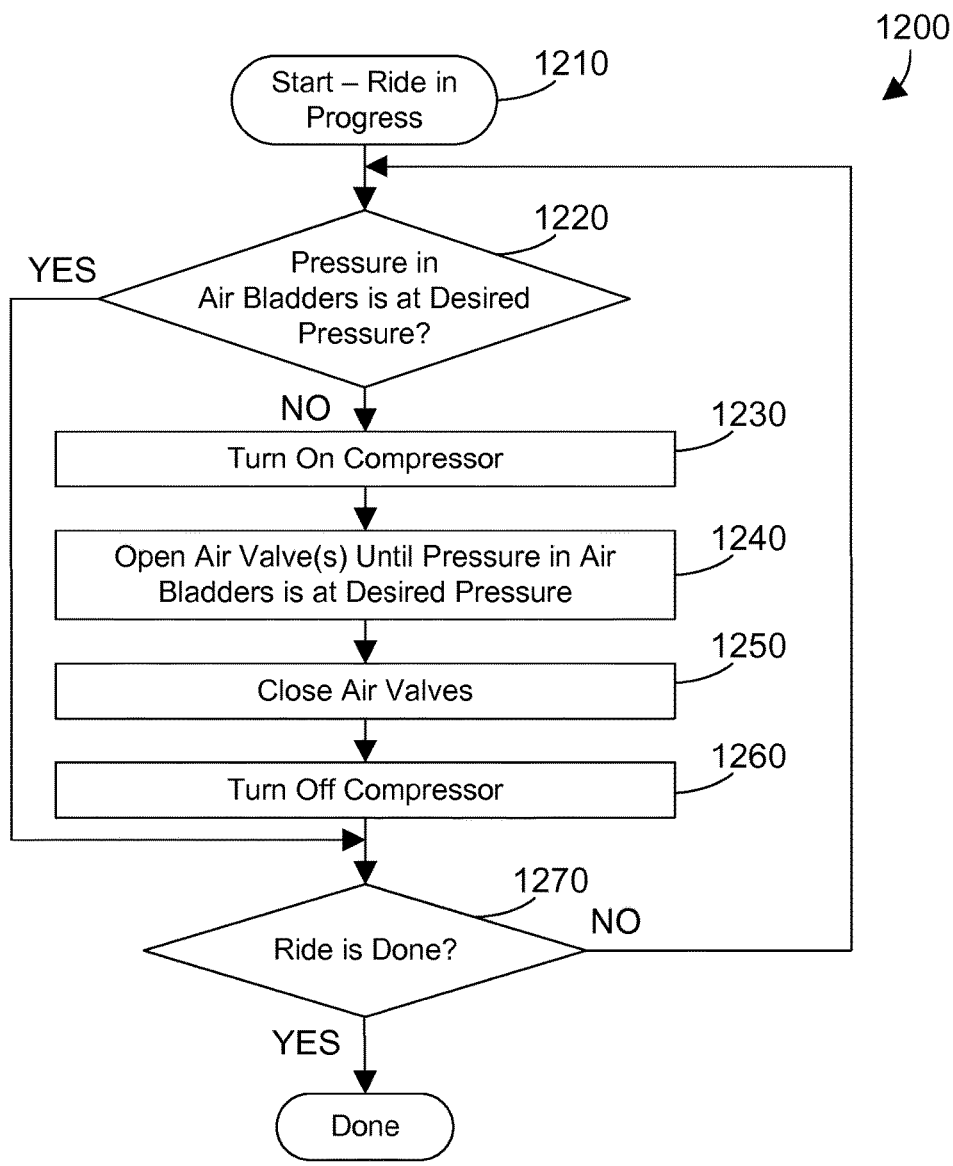
FIG. 11 is a table showing possible settings for desired pressure as a function of weight of the patient.
FIG. 12 is a flow diagram of a method for continuously monitoring and maintaining desired pressure in the air springs as a patient is transported on the cot platform.

FIG. 11 shows a table that correlates weight of a patient to desired pressure in the air bladders. For this specific example, there are five different air pressures specified for different weight ranges. We assume a lower threshold of 10 lbs. (4.5 kg) is selected, which means when the weight of the patient is less than 10 lbs. (4.5 kg), the desired air pressure is zero, which means the platform will be at its lower position. When the weight of the person is 10 to 50 lbs. (4.5 kg to 22.7 kg), the desired pressure is 3.5 pounds per square inch (psi) (24.1 kilopascals (kPa)). When the weight of the person is 50-165 lbs. (22.7 kg to 75 kg), the desired pressure is 8.0 psi (55.2 kPa). When the weight of the person is 165-250 lbs. (75 kg to 114 kg), the desired pressure is 11.5 psi (79.3 kPa). When the weight of the person is over 250 lbs. (114 kg), the desired pressure is 13 psi (89.6 kPa). Of course, finer weight divisions could be made with smaller differences in desired pressure as needed.

The specific values shown in table 1100 in FIG. 11 could vary according to many different factors, including the specific air bladders used, the size and weight of the cot platform, the weight of the empty cot, etc. The values in FIG. 11 are shown by way of example. The disclosure and claims herein extend to adjusting a cot platform to any one of a lower position and a plurality of upper positions.

Referring to FIG. 12, a method 1200 begins when a patient on a cot has been placed on the platform, method 1000 in FIG. 10 has been performed to initially adjust the air pressure in the air bladders, and the ambulance begins moving, which means the ride is in progress (step 1210). As long as the pressure in the air bladders is at the desired pressure (step 1220=YES) and the ride is not done (step 1270=NO), method 1200 loops back to step 1220 and continues. If the air bladders are no longer at the desired pressure (step 1220=NO), the controller turns on the compressor (step 1230), and opens one or more air valves to the air bladders until the pressure in the air bladders is at the desired pressure (step 1240). The controller then closes the air valves (step 1250) and turns off the compressor (step 1260). When the ride is not done (step 1270=NO), method 1200 loops back to step 1220 and continues. When the ride is done (step 1270=YES), method 1200 is done. Method 1200 allows for dynamically maintaining the air pressure in the air bladders at the desired pressure during a ride to assure the patient has the most comfortable ride possible, especially during long rides.

Figure 13:
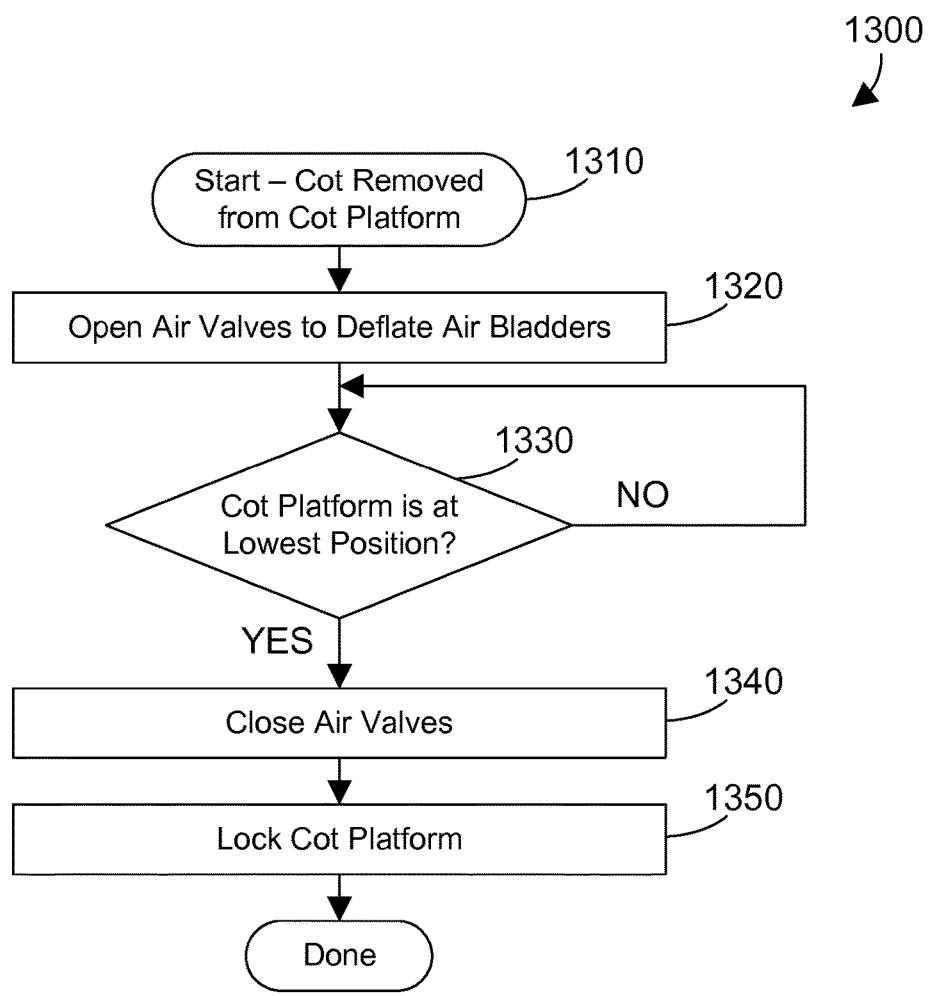
FIG. 13 is a flow diagram of a method for placing the cot platform in a locked state after a cot is removed from the cot platform.

Method 1300 in FIG. 13 shows what happens when a ride ends and a cot is removed from the cot platform (step 1310). The air valves are opened to deflate the air bladders (step 1320) by exhausting the air in the air bladders through the air valve(s) to ambient. As long as the cot platform is not at the lowest position (step 1330), method 1300 loops back and continues until the cot platform is at the lowest position (step 1330=YES). The air valves are closed (step 1340) and the cot platform is locked (step 1350) by engaging the platform lock. By locking the platform when not in use carrying a patient, the cot platform system protects the air bladders and load cells from undue stress and wear.

Figure 14:
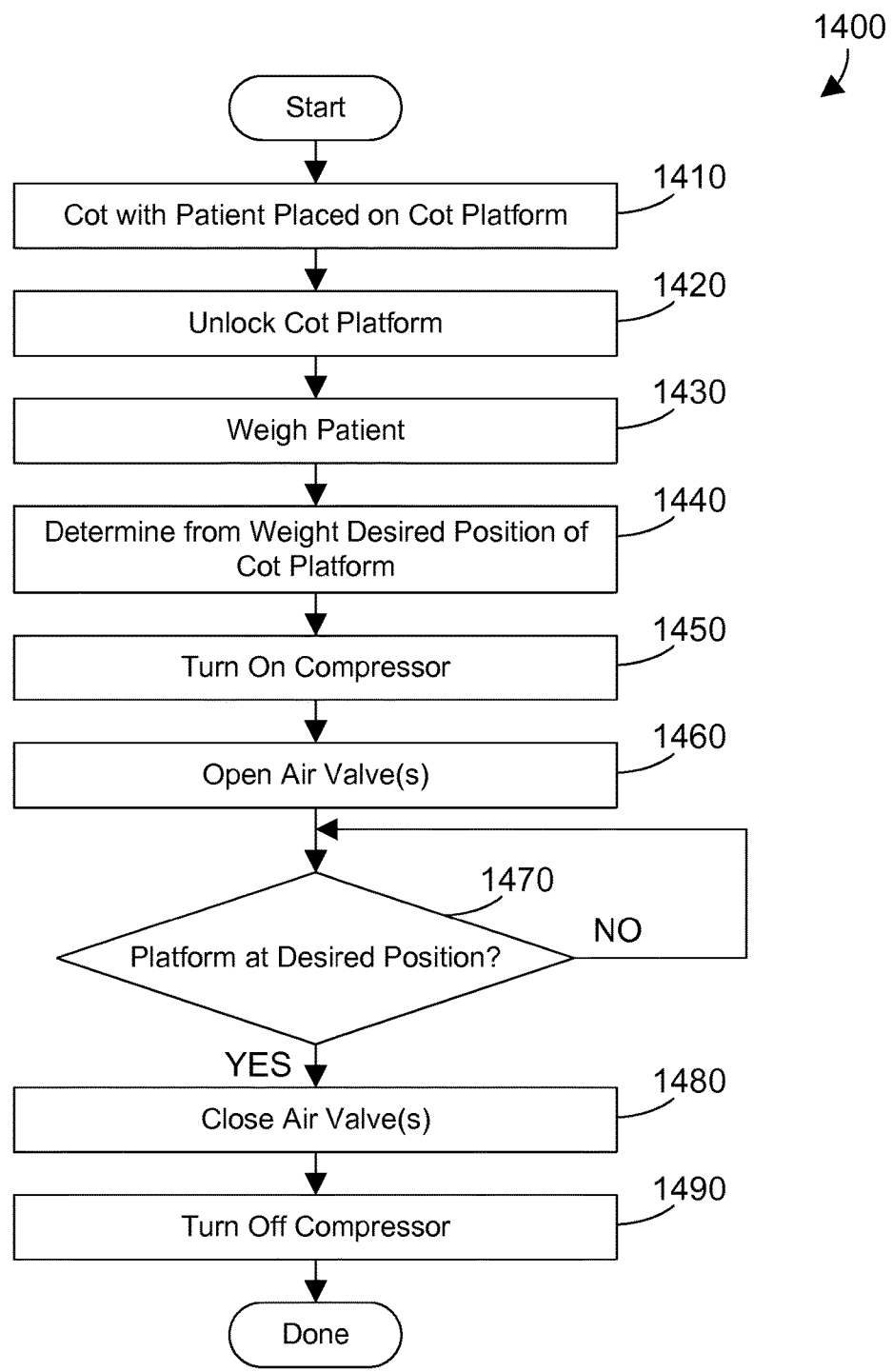
FIG. 14 is a flow diagram of a method for setting the position of the cot platform according to desired position that is determined from weight of the patient.

Referring to FIG. 14, a method 1400 shows steps to place a platform at a desired position based on one or more position detectors, shown as 130 in FIG. 1. A cot with a patient is placed on the cot platform (step 1410). The cot platform is unlocked (step 1420). The patient is weighed (step 1430). From the weight of the patient a desired position of the cot platform is determined (step 1440). The compressor is turned on (step 1450) and the air valve(s) are opened (step 1460) to inflate the air bladders. As long as the platform is not at the desired position (step 1470=NO), method 1400 loops back to step 1470 until the platform is at the desired position (step 1470=YES). The air valve(s) are closed (step 1480) and the compressor is turned off (step 1490). Note the determination of whether or not the platform is at the desired position in step 1470 can be made using air pressure as shown in method 1000 in FIG. 10, or could be made using any suitable position detector(s) shown at 130 in FIG. 1, as described by way of example with respect to FIGS. 5-9.

Figure 15:
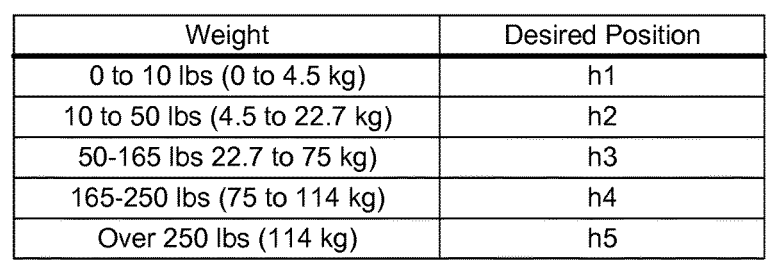
FIG. 15 is a table showing different desired platform positions as a function of the weight of the patient.

The table 1500 in FIG. 15 shows a correlation between weight of a patient and desired position of a platform. Note the desired positions are given as variables instead of actual units because the units will depend upon the air bladders used. However, the desired positions h1, h2, h3, h4 and h5 shown in FIG. 15 are understood to be different positions for the platform, as shown in FIGS. 5-9. For a patient weight of 0 to 10 lbs. (0 to 4.5 kg), the desired position is h1. For a patient weight of 10 to 50 lbs. (4.5 kg to 22.7 kg), the desired position is h2. For a patient weight of 50-165 lbs. (22.7 kg to 75 kg), the desired position is h3. For a patient weight of 165-250 lbs. (75 kg to 114 kg), the desired position is h4. For a patient weight over 250 lbs. (114 kg), the desired position is h5. Method 1400 and table 1500 show that position of the cot platform may be used and varied according to weight of the patient being transported to provide a comfortable ride to the patient.

While the difference between platform positions shown in FIGS. 5-9 is shown as a linear function by virtue of the limit switches 520 being equally spaced apart, this is shown for purposes of illustration, and is not limiting. The desired platform positions h1, h2, h3, h4 and h5 in FIG. 15 could be non-linear according to the desired platform height based on the detected weight of the patient. This is one reason the desired positions in FIG. 15 are shown as variables instead of fixed values. The disclosure and claims herein extend to a lower position for the platform and any suitable number of upper positions for the platform that are a function of a lower position for the vertical supports (such as air bladders) and a plurality of upper positions for the vertical supports.

An ambulance cot platform system allows variably raising a cot platform to many different positions to accommodate patients with varying weights. After a cot with a patient is placed on the cot platform, the weight of the patient is determined, and a desired position of multiple defined positions of the cot platform is determined from the patient's weight. The multiple defined positions may be a function of air pressure in air bladders, or the physical location of the platform itself. The air bladders are then inflated or deflated until the desired position of the cot platform is achieved. The result is a cot platform that has different positions to accommodate patients of different weights, thereby providing a ride with comfort that is optimized according to the weight of the patient being transported.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, the ambulance cot platform system could include recessed portions on the platform that receive the wheels of a cot to keep the cot from rolling off the platform. In addition, a locking mechanism could be installed that locks the cot in place after the cot is put on the platform.

The invention claimed is:
1. An apparatus comprising:
a plurality of variable supports that are each adjustable to a plurality of vertical positions;
a platform supported by the plurality of variable supports that is adjustable by adjusting the plurality of variable supports;

a controller that adjusts a vertical position of each of the plurality of variable supports until the platform is at a desired one of a lower position and a plurality of upper positions; and a platform lock activated by the controller that locks the platform in the lower position.

2. The apparatus of claim 1 wherein the plurality of variable supports each comprises an air bladder.

3. The apparatus of claim 1 wherein the controller disengages the platform lock when the controller receives an indication the platform needs to be raised from the lower position to one of the plurality of upper positions and adjusts the plurality of variable supports until the platform is at the one upper position.

4. The apparatus of claim 3 wherein, when the controller receives an indication the platform needs to be lowered from the one upper position to the lower position, the controller adjusts the plurality of variable supports until the platform is at the lower position, then engages the platform lock to retain the platform at the lower position.

5. The apparatus of claim 1 further comprising at least one mechanical dampener coupled to the platform that minimizes lateral movement of the platform.

6. The apparatus of claim 1 further comprising at least one weight sensor that measures weight on the platform, wherein the controller determines one of the plurality of upper positions for the platform based on the measured weight on the platform.

7. An apparatus comprising:
a plurality of air bladders that are each adjustable to a plurality of vertical positions by adjusting air pressure in the plurality of air bladders;
a platform supported by the plurality of air bladders;
at least one weight sensor that measures weight on the platform;
at least one position detector that detects a lower position and a plurality of upper positions for the platform; and
a controller that selects based on the measured weight on the platform one of the lower position and the plurality of upper positions for the platform and adjusts a vertical position of the plurality of air bladders by adjusting air pressure in the plurality of air bladders until the platform is at the selected one of the lower position and the plurality of upper positions as determined by the at least one position detector.

8. The apparatus of claim 7 wherein the controller selects the lower position when the measured weight is less than a first defined threshold.

9. The apparatus of claim 8 wherein the controller selects a first of the plurality of upper positions when the measured weight is greater than the first defined threshold and less than a second defined threshold by selecting a first desired air pressure for the plurality of bladders that corresponds to the first of the plurality of upper positions.

10. The apparatus of claim 9 wherein the controller selects a second of the plurality of upper positions when the measured weight is greater than the second defined threshold and less than a third defined threshold by selecting a second desired air pressure for the plurality of bladders that corresponds to the second of the plurality of upper positions.

11. The apparatus of claim 10 wherein the controller selects a third of the plurality of upper positions when the measured weight is greater than the third defined threshold and less than a fourth defined threshold by selecting a third desired air pressure for the plurality of bladders that corresponds to the third of the plurality of upper positions.

12. The apparatus of claim 11 wherein the controller selects a fourth of the plurality of upper positions when the measured weight is greater than the fourth defined threshold for the plurality of bladders by selecting a fourth desired air pressure that corresponds to the fourth of the plurality of upper positions.

13. An apparatus comprising:
a plurality of air bladders that are each adjustable to a plurality of vertical positions by adjusting air pressure in the plurality of air bladders;
a platform supported by the plurality of air bladders;
at least one weight sensor that measures weight on the platform;
at least one position detector that detects a lower position and a plurality of upper positions for the platform; and
a controller that selects based on the measured weight on the platform one of the lower position and the plurality of upper positions for the platform and adjusts a vertical position of each of the plurality of air bladders by adjusting air pressure in the plurality of air bladders until the platform is at the selected one of the lower position and the plurality of upper positions as indicated by the at least one position detector.

14. The apparatus of claim 7 wherein the controller selects the lower position when the measured weight is less than a first defined threshold.

15. The apparatus of claim 8 wherein the controller selects a first of the plurality of upper positions when the measured weight is greater than the first defined threshold and less than a second defined threshold.

16. The apparatus of claim 9 wherein the controller selects a second of the plurality of upper positions when the measured weight is greater than the second defined threshold and less than a third defined threshold.

17. The apparatus of claim 10 wherein the controller selects a third of the plurality of upper positions when the measured weight is greater than the third defined threshold and less than a fourth defined threshold.

18. The apparatus of claim 11 wherein the controller selects a fourth of the plurality of upper positions when the measured weight is greater than the fourth defined threshold.

19. An apparatus comprising:
a plurality of air bladders that are each adjustable to a plurality of vertical positions by adjusting air pressure in the plurality of air bladders;
a plurality of air valves coupled to an air source and coupled to the plurality of air bladders that can be activated to couple the air source to the plurality of air bladders and that can be activated to exhaust air in the plurality of air bladders;
at least one pressure sensor that measures air pressure in the plurality of air bladders;
a platform supported by the plurality of air bladders;
at least one weight sensor that measures weight on the platform;
a platform lock that locks the platform in a lower position;
a controller that selects based on the measured weight on the platform one of the lower position and a plurality of upper positions for the platform and adjusts a vertical position of each of the plurality of air bladders by adjusting air pressure in the plurality of air bladders until the platform is at the selected one of the lower position and the plurality of upper positions by activating the plurality of air valves, wherein the controller disengages the platform lock when the controller receives an indication the platform needs to be raised from the lower position to one of the plurality of upper positions and adjusts the plurality of air bladders by activating the plurality of air valves until the platform is at the one upper position as indicated by the at least air pressure sensor, wherein, when the controller receives an indication the platform needs to be lowered from the one upper position to the lower position, the controller adjusts the plurality of air bladders until the platform is at the lower position by activating the plurality of air valves to exhaust air from the plurality of air bladders, then engages the platform lock to retain the platform at the lower position, wherein the controller selects the lower position when the measured weight is less than a first defined threshold, selects a first of the plurality of upper positions when the measured weight is greater than the first defined threshold and less than a second defined threshold, selects a second of the plurality of upper positions when the measured weight is greater than the second defined threshold and less than a third defined threshold, selects a third of the plurality of upper positions when the measured weight is greater than the third defined threshold and less than a fourth defined threshold, and selects a fourth of the plurality of upper positions when the measured weight is greater than the fourth defined threshold.

* * * * *